(12) United States Patent (10) Patent No.: US 7,479,875 B2
Fehling et al. (45) Date of Patent: Jan. 20, 2009

(54) METHOD OF AND SYSTEM FOR MANAGING DATA IN A SENSOR NETWORK

(75) Inventors: Ronny Fehling, Montreal (CA); Prabuddha Biswas, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 181 days.

(21) Appl. No.: 11/433,379

(22) Filed: May 12, 2006

(65) Prior Publication Data

US 2007/0265866 A1 Nov. 15, 2007

(51) Int. Cl.
*G08B 29/00* (2006.01)
(52) U.S. Cl. .................. 340/506; 340/3.1; 340/825.36; 340/825.49
(58) Field of Classification Search .............. 340/506, 340/3.1, 825.36, 825.49, 511, 517, 521, 522, 340/524, 525
See application file for complete search history.

(56) References Cited

U.S. PATENT DOCUMENTS

| | | | |
|---|---|---|---|
| 5,400,246 A * | 3/1995 | Wilson et al. .................. 700/17 |
| 5,839,088 A | 11/1998 | Hancock et al. ............. 701/213 |
| 6,047,236 A | 4/2000 | Hancock et al. ............. 701/208 |
| 6,085,976 A | 7/2000 | Sehr .......................... 235/384 |
| 6,202,023 B1 | 3/2001 | Hancock ..................... 701/201 |
| 6,202,065 B1 | 3/2001 | Wills ............................. 707/5 |
| 6,295,502 B1 | 9/2001 | Hancock et al. ............. 701/201 |
| 6,295,528 B1 | 9/2001 | Marcus et al. ................ 707/3 |
| 6,378,043 B1 | 4/2002 | Girkar et al. ................ 711/133 |
| 6,496,814 B1 | 12/2002 | Busche ........................ 706/21 |
| 6,577,714 B1 | 6/2003 | Darcie et al. ............. 379/93.17 |
| 6,580,916 B1 | 6/2003 | Weisshaar et al. ........... 455/456 |
| 6,594,666 B1 | 7/2003 | Biswas et al. ............... 707/100 |

OTHER PUBLICATIONS

"DOD Releases Final RFID Fan", by Mark Roberti, RFID Journal, 2002-2006, http://www.rfidjournal.com/article/articleprint/1080/-1/1/.
"Metro cites the high cost of RFID chips and interference as issues that need to be tackled before mass adoption", by John Blau, IDG News Service, Mar. 8, 2006, http://ww6.infoworld.com/products/print$_{13}$ friendly.jsp?link=/article/06/03/08/76222_HNrfidadoption_1 . . . .
"RFID Primer: Where the WLAN Hits the RFID Fan", by Ken Crawford with Alex Goldman, Dec. 23, 2003, http://www.isp-planet.com/fixed_wireless/technology/2003/rfid_primer.html.
"RFID Primer: Where the WLAN Hits the RFID Fan-continued", by Ken Crawford with Alex Goldman, Dec. 23, 2003, http://www.isp-planet.com/fixed_wireless/technology/2003/rfid_primer_complexities.html.

(Continued)

*Primary Examiner*—Daryl C Pope
(74) *Attorney, Agent, or Firm*—Park, Vaughan & Fleming LLP

(57) ABSTRACT

The present invention relates to a method of and system for managing sensor data in a computer database environment. An exemplary method of the invention is described, comprising the steps of: defining a Sensor Network environment in terms of zones, each zone being defined by its entrance or exit condition, and having a distinct and consistent property associated with it; collecting sensor data regarding the state of objects within the Sensor Network environment; analyzing the collected sensor data in the context of said Sensor Network environment and the zones; and storing the analyzed sensor data as records in a database, in an application agnostic form, and in terms of the zones. A corresponding system is also described.

30 Claims, 12 Drawing Sheets

OTHER PUBLICATIONS

"RFID Primer: Where the WLAN Hits the RFID Fan-continued", by Ken Crawford with Alex Goldman, Dec. 23, 2003, http://www.isp-planet.com/fixed_wireless/technology/2003/rfid_primer_conclusion.html.

"Gaining on Business Intelligence", by Mark van de Wiel, Oracle Magazine, May/Jun. 2003, http://www.oracle.com/technology/oramag/oracle/o3-may/033business.html.

"Oracle Warehouse Builder 10g", by Jean-Pierre Dijcks, Architectural White paper, Feb. 2004, http://otn.oracle.com/products/warehouse/content.html.

"Oracle Data Mining 10g Release 2- Know More, Do More, Spend Less", by Charlie Berger, Oracle Whitepaper, Sep. 2005.

* cited by examiner

| Zone ID | Zone Name | related Gate Sensors | related Zone Sensors | PARENT | CHILD |
|---|---|---|---|---|---|
| 1 | PSZ_1 | Receiving_1 Receiving_2 Picking_IN Picking_OUT Shipping_1 Shipping_2 | Smartshelf_1 Smartshelf_2 Smartshelf_3 | | PSZ_2 PSZ_3 PSZ_4 PSZ_5 |

Table 1

| Zone ID | Zone Name | Origin | Quality function | PARENT | | CHILD | |
|---|---|---|---|---|---|---|---|
| | | | | Zone ID | Inheritance | Zone ID | Inheritance |
| 2 | SCZ_2 | \<Location of sensor\> | \<quality decrease with distance function\> | | \<inheritance function\> | PSZ_1<br>PSZ_2<br>PSZ_3<br>PSZ_4<br>PSZ_5 | 100%<br>0%<br>0%<br>0%<br>100% |

TABLE 2

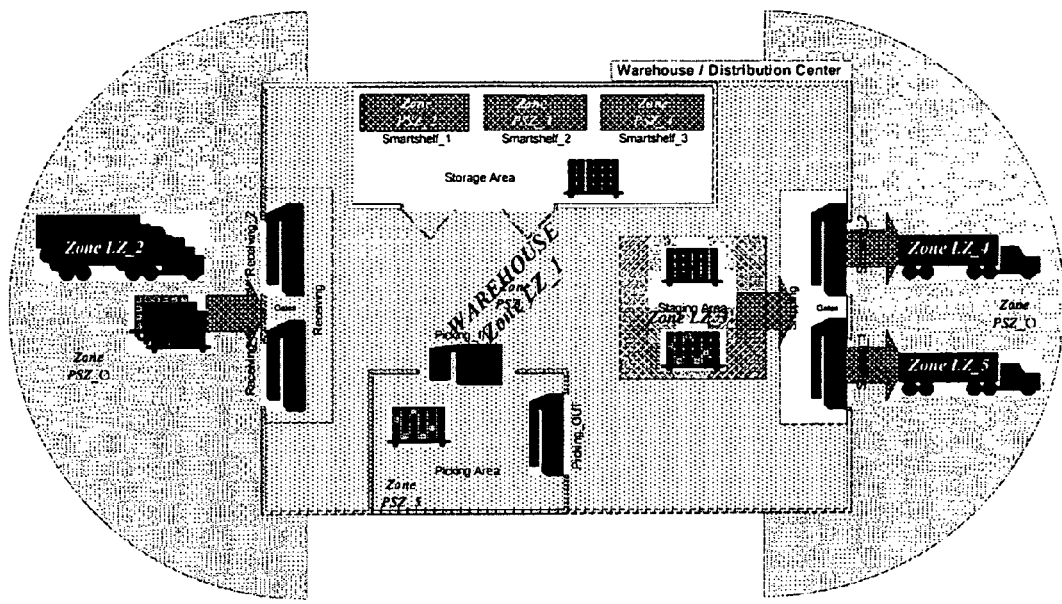

Figure 9

| Zone ID | Zone name | Enter Condition | Exit Condition | PARENT | CHILD |
|---|---|---|---|---|---|
| 1 | LZ_1 | Any object O that comes into one of the receiving gates AND time $T_O$ is during opening hours AND O is validated against an existing manifest M | Any object O that was in LZ_3 AND time $T_O$ is during opening hours AND O is verified against a valid shipping manifest M | | LZ_2 PSZ_1 PSZ_2 PSZ_3 PSZ_4 SCZ_1 SCZ_2 |
| 2 | LZ_2 | Any object O that leaves (PSZ_2 OR PSZ_3 OR PSZ_4 OR Picking_OUT) at time $T_O$ AND Time $T_{NOW}$ is now $T_O+c$ AND O is still in any PARENT zone P | Shipping_1 Shipping_2 | LZ_1 PSZ_1 | |

Table 3

| Zone ID | Zone Name | related Gate Sensors | related Zone Sensors | PARENT | CHILD |
|---|---|---|---|---|---|
| 1 | PSZ1 | S1 S3 | S2 | | PSZ2 |
| 2 | PSZ2 | | S2 | PSZ1 | |
| 3 | PSZ3 | S3 | | | |

Table 4

| *Possible Zone Transition Table* | |
|---|---|
| from_zone_id | to_zone_id |
| PSZ_∅ (universal) | PSZ1 |
| PSZ1 | PSZ_∅ (universal) |
| PSZ1 | PSZ2 |
| PSZ1 | PSZ3 |
| PSZ2 | PSZ1 |
| PSZ3 | PSZ1 |

Table 5

| *Context Based Zone Transition Table* | | |
|---|---|---|
| from_zone_id | to_zone_id | condition |
| LZ_2 | LZ_1 | |
| PSZ3 | LZ_3 | |

Table 6

METHOD OF AND SYSTEM FOR MANAGING DATA IN A SENSOR NETWORK

FIELD OF INVENTION

The present invention relates generally to computers and computer databases, and more specifically, to a method of and system for managing sensor data in a computer database environment.

BACKGROUND OF THE INVENTION

Monitoring the flow, location and state of products has always been an important part of any supply chain management system. Only with this information can a business manager get a clear picture of the state of his system, and judge the impact of changes on it so that the system can be effectively maintained and improved.

A number of technologies have been used over the years to identify products in a supply chain, one of the most recent being optical bar codes. Identifying products, boxes, palettes and containers with bar codes has been very useful, but reading the bar code labels themselves has been problematic as they require line-of-site reading by an optical sensor. Bar codes can only be read if they are physically close enough to the reader and are properly oriented. Even if the bar code reading system is set up carefully, the reading-failure rate in an automated environment is still so high that many companies do their bar code reading manually despite the higher cost.

In recent years, the technology behind RFID (radio frequency identification) has been improving and it is being positioned to replace bar code technology. RFID can be used in many of the same supply chain, process control, inventory control and system management applications, but unlike bar coding, RFID uses wireless tags which do not need line-of-site access to be read. RFID scanning can be done at greater physical distances from sensors than bar coding, and the orientation of the RFID tag with respect to the sensor is a far less significant problem. As a result, RFID technology is providing much higher read-rates, allowing process speeds and efficiency to be increased. It is no surprise that RFID is quickly become one of the hottest new technologies, being encouraged along by mandates from the United States Department of Defense and large commercial retailers.

At a basic level, an RFID process control system consists of a collection of electronic RFID tags and a network of sensors at different physical locations within the system. Each electronic RFID tag is embedded with a unique electronic product code (EPC), transmitter and micro-antenna. When a tagged item passes within range of a sensor, the sensor receives the EPC via radio waves, identifies the item and its location, and relays this information to a central computer.

A standard database on the central computer can be used to collect and manage the RFID data in the same way that a database handles data from other kinds of sensors. However, existing databases are not designed to handle the "avalanche" of sensor data that is generated in an RFID system, let alone in a very efficient way. Thus, there is a need for a database system which can manage very large streams of RFID data; that is, a system which can manage the spatial and temporal fidelity at which we currently instrument and analyze the physical world.

In fact, this avalanche of data is a problem that is common to many of today's hardware and software systems and is not just exclusive to RFID. Today's process management systems produce more and more data as data acquisition tools and devices become cheaper and more available. RFID is just one example of sensor data produced by such systems.

Currently available sensor data management systems fall short of what is required in many respects, a number of which are outlined hereinafter. Once a database system is developed that can manage very large streams of RFID data, one will be able to support larger and more complex sensor networks where objects have to be tracked and traced throughout multiple operational steps and correlated with other sensor events. There are many environments in which such systems would be highly desirable including supply chains of perishable goods, sensitive and hazardous material management, security and access control, patient/employee safety, asset management and continuous & automated monitoring for systems and vehicles. Security systems (anti-terror, disaster relief, general defense) may also incorporate a multitude of sensors and potentially hundreds of dynamically changing applications that require sensor data. Thus, there is clearly a need to correlate data between various sensors in a complex and dynamic environment.

The management strategies that govern these operational environments are often formulated as mandates or directives. These directives apply to the environment itself as well as the movement of objects through it. For example, one may have a directive that pallets containing perishable food cannot be exposed to more than 20 F for more than 2 hours, regardless of where they are in the system. As another example, one may have a directive that a ceiling light is turned on only when an authorized person enters the room.

There are currently no sensor networks which organize sensor observation data in an efficient and application agnostic way such that these operational processes can be easily formulated, controlled and executed. Also, there is currently no way to accommodate contextual change, that is, the use of sensor data to change the operational process flow. For example, a change in a terror alert level may require that procedures be changed, but existing systems cannot accommodate such changes. As another example, NASA's chemical waste management procedures may change when a space shuttle is on site, but again, the existing systems cannot accommodate such change.

As well, application processes and events are usually defined on a higher interpretation level than pure observation data. That is, a receiving process is not simply an atomic sensor observation, but is usually a correlation of several sensor observations and context information. This includes, for example, the sensor which reported the observation. Legacy applications usually cannot be "sensor enabled" easily to correlate data and context information in this way.

Traditional process control systems follow objects throughout the operational environment, thus, they have to specify all of the unexpected situations that the objects can get into. This requires the application to keep complete control and knowledge about the state of the objects as well as the environment. In an operational environment it is usually assumed that such unexpected situations occur about 1% of the time, but nevertheless, the application should not crash when these situations occur. The application therefore has to be programmed with all the possible exceptions that could occur. Software developers generally spend 90% of their time dealing with this relatively small number of exceptions, dramatically expanding the code base and the complexity of every application. Existing systems do nothing to mitigate this problem.

Currently, most commercial retailers and suppliers are simply using RFID for tracking mainly at shipping or receiving, with tags seldom being reused in subsequent processes or being correlated with other sensor readings. In such an environment, RFID merely automates previously known processes and does not implement a more complex Sensor Network Environment definition. As well, the RFID sensor data generated in such an environment is mostly used by only one application. However, as observed from recent customers and industry trends (Factory Networks, Distributed Sensor Networks, RFID Journal, RFID Show and GridWorld, for example) as well as through EPC Global activities, both retailers and suppliers recognize that the use of additional sensor data and their correlation, as well as the utilization of this information by multiple applications, will yield a significantly higher return on investment. There are currently no effective systems which support such complexity.

Other problems with current implementations of process control systems include the following:

a) it is difficult to analyze data in existing systems because the sensor and analysis system has been generated without any regard for the underlying processes and operational environment context. Data is simply monitored and stored; and b) application processes and events are usually defined at a high level, yet typical database systems are intended to deliver pure observed data. Thus, there is a gap between the data being received and the judgments and observations which must be made.

There is therefore a need for a method of and system for managing sensor data in a computer database environment which addresses one or more of the problems outlined above. It is desirable that this design be application agnostic (i.e. the data collected and analyzed can be integrated with independent and disparate software applications). It is also desirable that this design be developed with consideration for efficiency, flexibility and cost.

SUMMARY OF THE INVENTION

It is therefore an object of the invention to provide an improved method of and system for managing sensor data in a computer database environment which obviates or mitigates at least one of the disadvantages described above.

One aspect of the invention is broadly defined as a method of managing sensor data comprising the steps of: defining a Sensor Network environment in terms of zones, each the zone being defined by its entrance or exit condition, and having a distinct and consistent property associated with it; collecting sensor data regarding the state of objects within the Sensor Network environment; analyzing the collected sensor data in the context of the Sensor Network environment and the zones; and storing the analyzed sensor data as records in a database, in an application agnostic form, and in terms of the zones.

Another aspect of the invention is broadly defined as a A system for managing sensor data comprising: a plurality of sensors for detecting environment conditions including the presence of objects; a Sensor management engine; and a database; the Sensor management engine being operable to: define a Sensor Network environment in terms of zones, each the zone being defined by its entrance or exit condition, and having a distinct and consistent property associated with it; collect data from the sensors regarding the state of objects within the Sensor Network environment; analyze the collected sensor data in the context of the Sensor Network environment and the zones; and store the analyzed sensor data as records in a database, in an application agnostic form, and in terms of the zones.

The intent of this architecture is to offer a simple and easy to understand framework to customize process management solutions for individual implementations. The use of zones and zone-transitions dramatically reduces the complexity of these solutions as well as the amount of software code that is required to be implemented, while maintaining the overall goal of a sensor network, which is to have total visibility throughout the operational process chain. This is basically achieved by reversing the traditional view on an operational environment; driving the design of the process management system from the physical reality, rather than designing the process management system anew, and hoping that it will be effective.

Any area that has a distinct and consistent property associated with it, can be defined as a "zone". For example, the inside of a refrigerator could be considered a zone, as the physical property of temperature within it may be considered uniform throughout for the purposes of the system. The fact that the refrigerator can be distinguished by its walls is convenient as a practical matter, but it is really the common temperature that defines and distinguishes it as a zone. A specific floor area in a warehouse, such as a waiting area adjacent to a loading bay, can also be defined as a zone, regardless of whether the floor area has any physical boundaries at all. In the case of the waiting area, the only distinct property of the zone may be that products that are left in that area have a specific logical state associated with them—they are waiting to be loaded into a truck. Other examples of zones, such as defining them in terms of their entrance and exit conditions, are described hereinafter.

In the description which follows, various state-aware zones are described, as are zone transitions and an application agnostic sensor network environment. Of course, many aspects of the zone-enabled sensor system could be used for data other than RFID data. In general, any geographically distributed sensor data or environments where disparate sensor data has to be managed and correlated, could benefit from the teachings herein.

This summary does not necessarily describe all features of the invention.

BRIEF DESCRIPTION OF THE DRAWINGS

These and other features of the invention will become more apparent from the following description in which reference is made to the appended drawings wherein.

Figure 7:
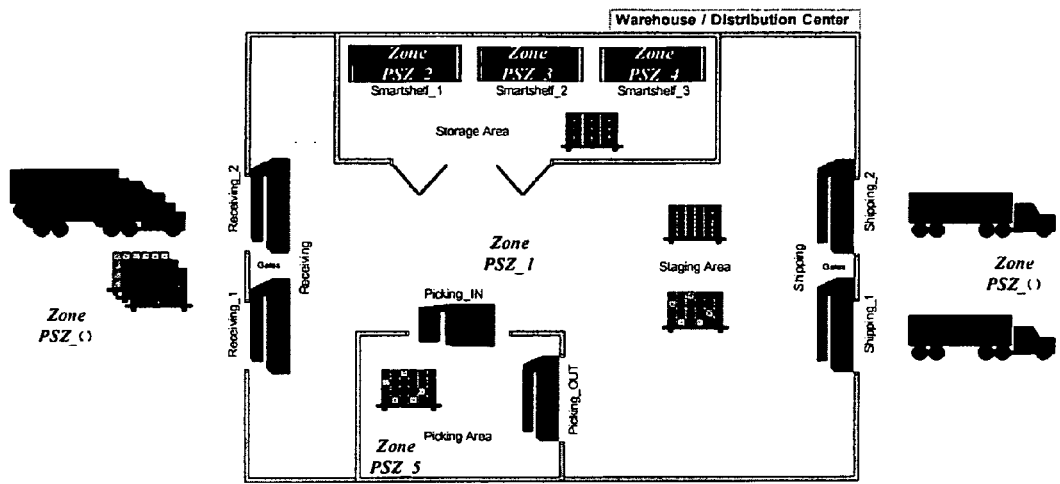
Figure 8:
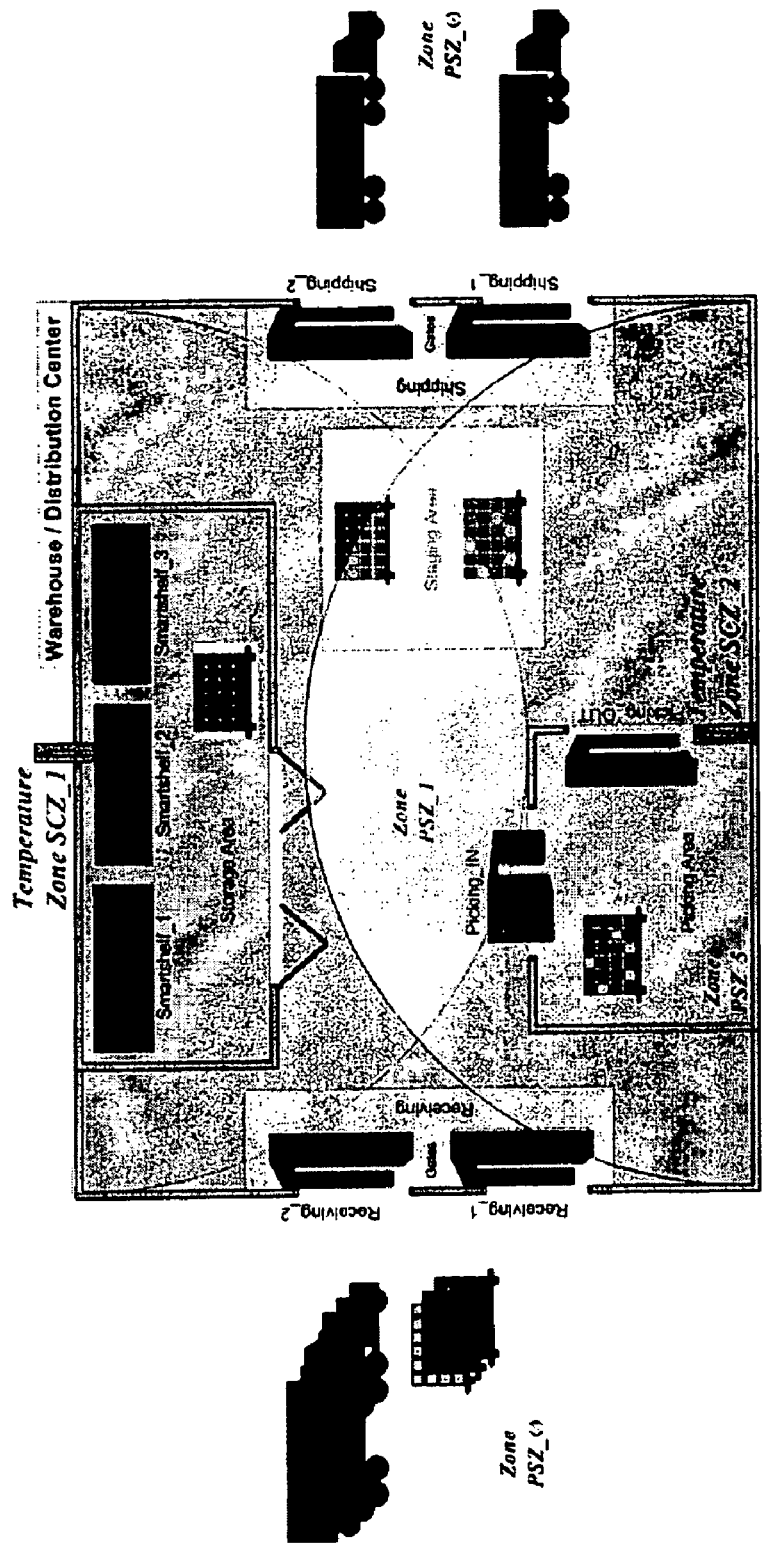
Figure 10:
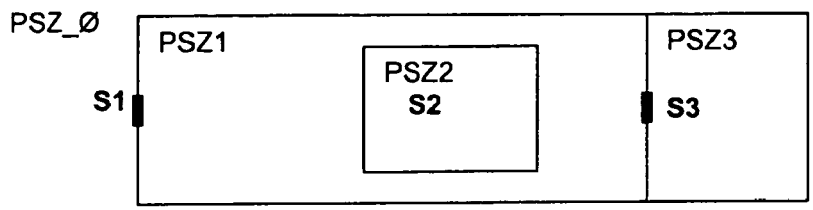
Figure 11:
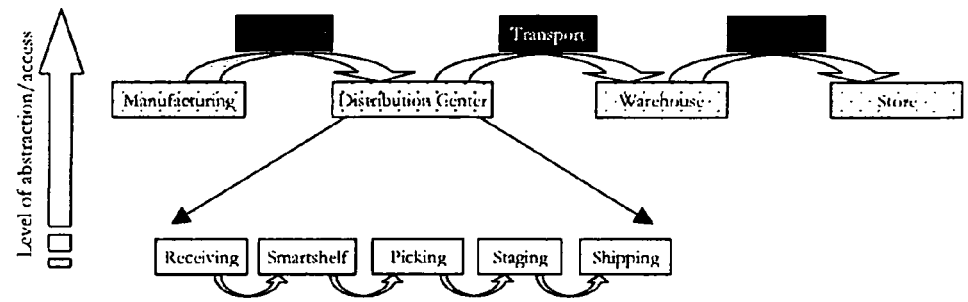
Figure 12:
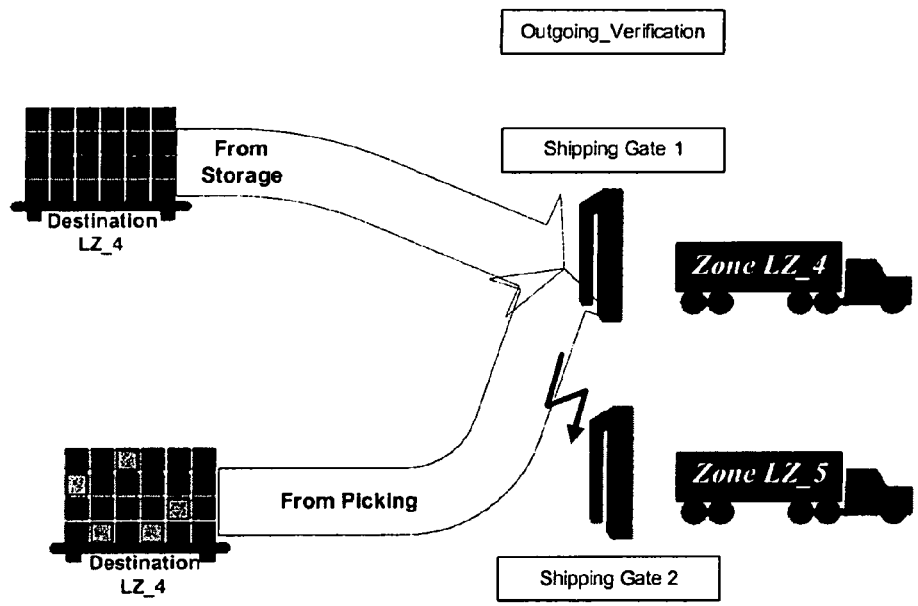

TABLE 1 presents the data model associated with an exemplary physical sensor zone (PSZ);

FIG. 7 presents a schematic diagram of an exemplary sensor system, depicting PSZ zones;

TABLE 2 presents the data model associated with an exemplary sensor coverage zone (SCZ);

FIG. 8 presents a schematic diagram of an exemplary sensor system, depicting SCZ zones;

TABLE 3 presents the data model associated with an exemplary logic zone (LZ);

FIG. 9 presents a schematic diagram of an exemplary sensor system, depicting LZ zones;

FIG. 10 presents a schematic diagram of an exemplary sensor system, for the purposes of describing the use of Possible Zone Transitions (PZTs);

TABLE 4 presents the data model associated with an exemplary set of Possible Zone Transition Zones (PZTs);

TABLE 5 presents the data model associated with an exemplary Possible Zone Transition Table;

TABLE 6 presents the data model associated with an exemplary Context Based Zone Transition Table;

FIG. 11 presents an exemplary process flow diagram of an implementation of the invention; and FIG. 12 presents a schematic diagram of an exemplary sensor system, for the purposes of explaining closeness templates.

DESCRIPTION OF THE PREFERRED EMBODIMENTS

The above described problems can be addressed by employing a Sensor Network environment using State-Aware Zones and Zone transitions. This application agnostic Sensor Network environment is the organizing principle for sensor data. The system organizes the sensor data by representing it in a data model that maps the operational environment and its processes. Now software applications can access the data in a form they are familiar with and they do not have to worry about the sensor data acquisition. Process design is simplified in that it can be formulated in the application model layer and then translated and executed on the sensor data model layer.

The Sensor Network environment includes the location, containment, inheritance, coverage, connectivity and constraints of sensors. This environment configuration helps define the operational and business process rules that apply in the Sensor Network. These operational and business process rules can be defined through layers, allowing for a template model that can be easily customized for each operational environment. These templates can represent an overall mandate on a horizontal or vertical level for the operational environment.

These templates are described in greater detail hereinafter, but in short, they can be regarded as 'wizards' similar to those used in the windows environment. These wizards represent common business processes, such as 'goods receiving', 'chemical spill' or 'terrorist attack'. The wizards guide the user through the parameterization of the 'workflow' of these processes. Most of these templates are composed of lower level templates which are formulated on the operational layer—the sensor environment, such as templates for physically adjacent sensors, but higher level templates can also be developed which are responsive to multiple sensor and state inputs.

In order to achieve this, a set of properties or meta-data is applied to each sensor and to the sensor network as a whole. This information, together with the environment description, is described as the Sensor Data Model. The model in itself is also a temporal construct that can vary over time. Subsequently, all Zone constructs which are built on the model, have a validity time defined through a start and end time of their construct. Zones are objects which are implemented in the model and configured through meta-data information. Constraints and containments can be defined on Zones that can, as the meta-data information as well, be inherited by or passed down to other Zones.

Three different types of Zones are proposed:
1. Physical Sensor Zones (PSZ): A PSZ is defined through one or more Sensors. The Sensor meta-data defines whether a given Sensor is a Gate Sensor (between two Zones) or a Zone Sensor (defining a Zone). In order to determine the direction that an object is moving, the Sensor can either report the direction itself or other sensor correlation or utilize a condition function, which could be based on a state change model. Additionally, a PSZ can describe its relationship to another PSZ, for example through a containment hierarchy;
2. Sensor Coverage Zones (SCZ): A SCZ is a spatio-temporal entity which includes the (temporal) location of the Sensor, its quality of measurement, the area in which its measurements are valid and the quality change coefficient which describes the change of quality with increasing distance (or time). Additionally, SCZs include all properties of PSZs; and
3. Logical Zones (LZ): A LZ does not need to be tied to any Sensor or Actuator. It can represent a conglomerate of Sensors and PSZ and SCZ together with abstract constraints. A LZ can incorporate additional context to determine whether an object is inside or outside the LZ. A LZ can be defined through access privileges of a user or application, or users/applications may overlay their logical zones on top of the physical environment.

It is also preferable that a Zone Transition Model be utilized to define constraints on zones which describe or restrict movements of objects through zones. That is, one can collect data in terms of how objects move from one zone to another, and also place restrictions on what movements are allowed. For example, if an object is found to miraculously move from one zone to another which is not physically close or adjacent, it may be desirable to bring this inconsistency to the attention of the operator.

With such a Zone and Zone Transition Model, the operational manager can now define rules or actions based on a Zone event rather than solely on a Sensor Observation. It is also possible with this system to specify a rule or action based on a correlation of two disparate sensor observations specified by a time window and/or order and/or zone movement/transition. Software applications can now be easily "sensor enabled" as the proposed Zone Model offers a data organizing principle that leverages the raw sensor observation data into a context aware model.

In the prior art, complex workflows were defined based on sensor observation and application event triggers. Each application utilizing the sensor observations had to derive, compute, interpret and maintain individually the state of the object movement, causing a lot of duplication of similar logic, therefore increasing computational and administration complexity. Legacy applications therefore usually could only be sensor enabled in a very limited, simple way. Also, all sensor observations needed to be sent directly to every listening application, even if that observation did not cause a significant application event. This was prohibitive in a distributed application environment as it required a lot of duplicate and unnecessary traffic.

The Zone Model is built on a state-aware Sensor Network Environment which organizes the sensor observation and virtualizes the operational environment (that is, it maps the physical operation environment and movement onto a machine understandable state change model). This in turn enables applications sharing the state-aware virtualization to define their conditions of interest such that only relevant state changes are propagated to them. Some of the most interesting business process requirements are notifications about events that were expected, but actually did not occur. These kinds of events are referred to herein as Non-Events. A state-aware Sensor Network Environment as proposed allows for an easy configuration of an expected operational flow. If, for example, an object is supposed to move from one zone to another within 24 hours or an object is not supposed to stay in a zone longer than 2 hours if the temperature in that zone is above a certain threshold, the system is easily able to transmit notifications in case of the expiration of the condition as it maintains the state of the object and the zone.

When a sensor observation is read through a physical process (electrical current through the sensor), that observation is translated into an application event. If a software application wants to be 'Sensor Network' aware or enabled, it needs to model those events. Applying such a model to a distributed environment (grid) and/or multiple applications that need to have access to the same sensor data—that is, open loop environments as opposed to closed loop—presents a practical problem as every software application will need to replicate this (similar) environment.

Thus, it is preferred to use an Active Sensor Data Model (SDM) which does this virtualizing of the physical world into an operational environment model and actively notifies the software applications of the relevant state changes. This "active notification" could be done, for example, using "change notification" as known in the database art.

Also, various software applications may 'subscribe' to the state changes that are offered by the Active Sensor Data Model. These subscriptions are offered through configurable templates. These are described in greater detail hereinafter.

Figure 1:
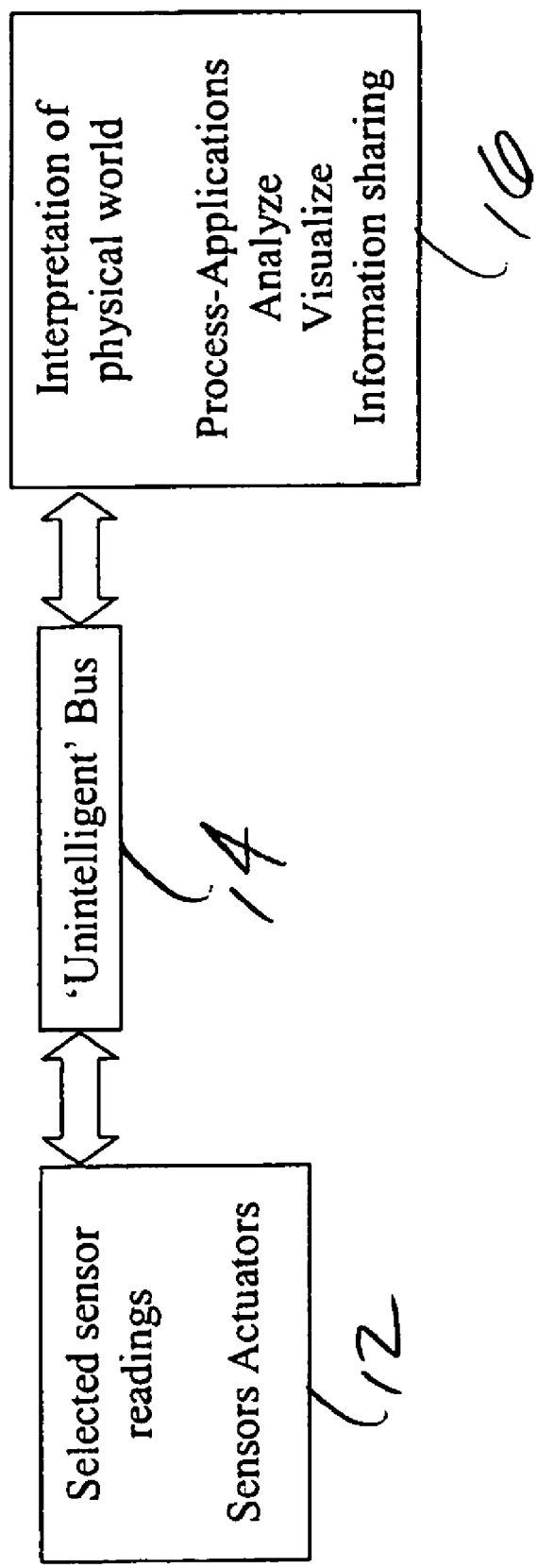
FIG. 1 presents a block diagram of sensor system as known in the art.

Sensor Data inherently does not represent application significant events and has to be interpreted by an application model. As shown in FIG. 1, sensors and actuators 12 heretofore simply transmitted data over an unintelligent bus 14, to a software application 16 which received, stored, analyzed and interpreted the data for its own dedicated purposes. Each software application 16, of course, could interpret the sensor data differently.

Figure 2:
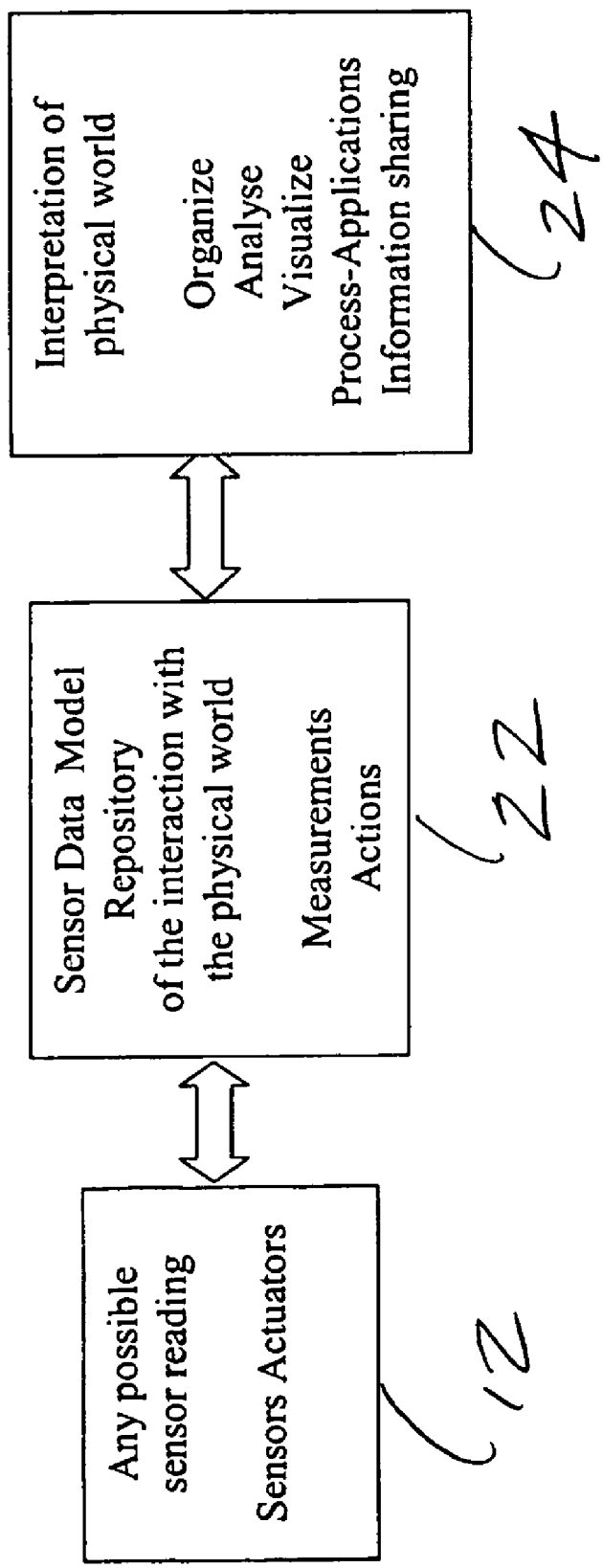
FIG. 2 presents a block diagram of sensor system in accordance with an embodiment of the present invention.

In contrast, the system shown in FIG. 2 makes it possible to effectively act as a fan-in fan-out model serving hundreds, if not thousands of software applications, sensors and actuators in a highly distributed system for Sensor Networks. In this case, the sensors and actuators 12 transmit data to a sensor data model repository 22 which receives, stores and analyzes the data, and places it in an application agnostic form which can be accessed by many applications 24.

This architecture is especially capable when dealing with such environments where the majority of the time, the working of the operational environment is deterministic and controlled. This is achieved by specifying the operational environment (rather than the objects themselves) and how objects can move within it. This is simpler and can be done both in a very short time and by the person who is best suitable for it, the operational manager himself. This model virtualizes the physical world and presents it to applications that no longer have to maintain the current or past state of the world.

Figure 3:
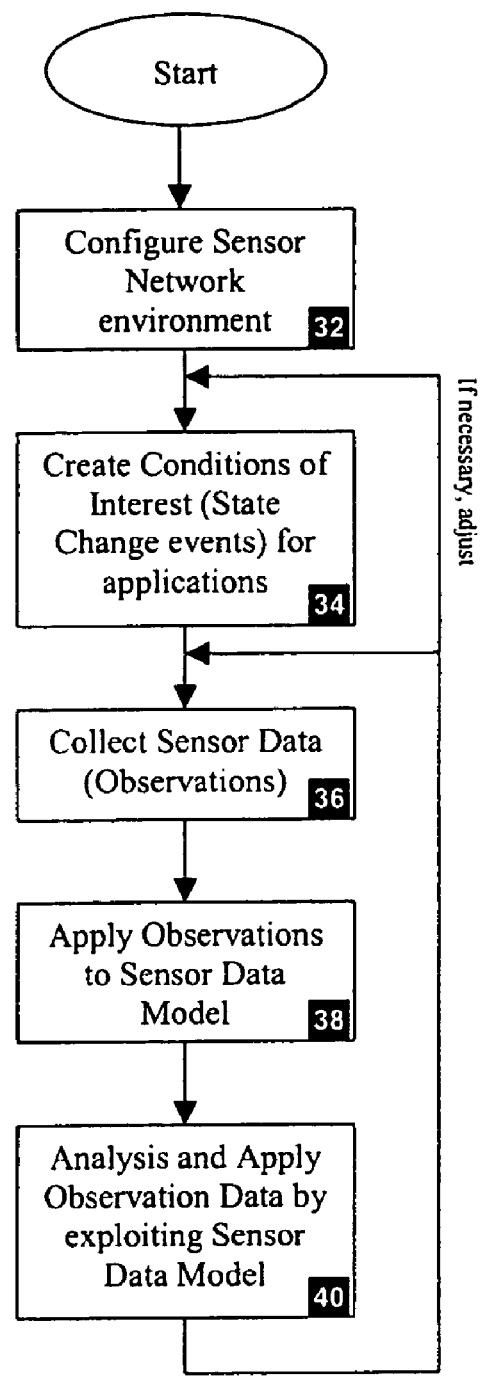
FIG. 3 presents a flow chart of a broad method of generating and operating a Sensor Network Environment in an embodiment of the invention.
Figure 4:
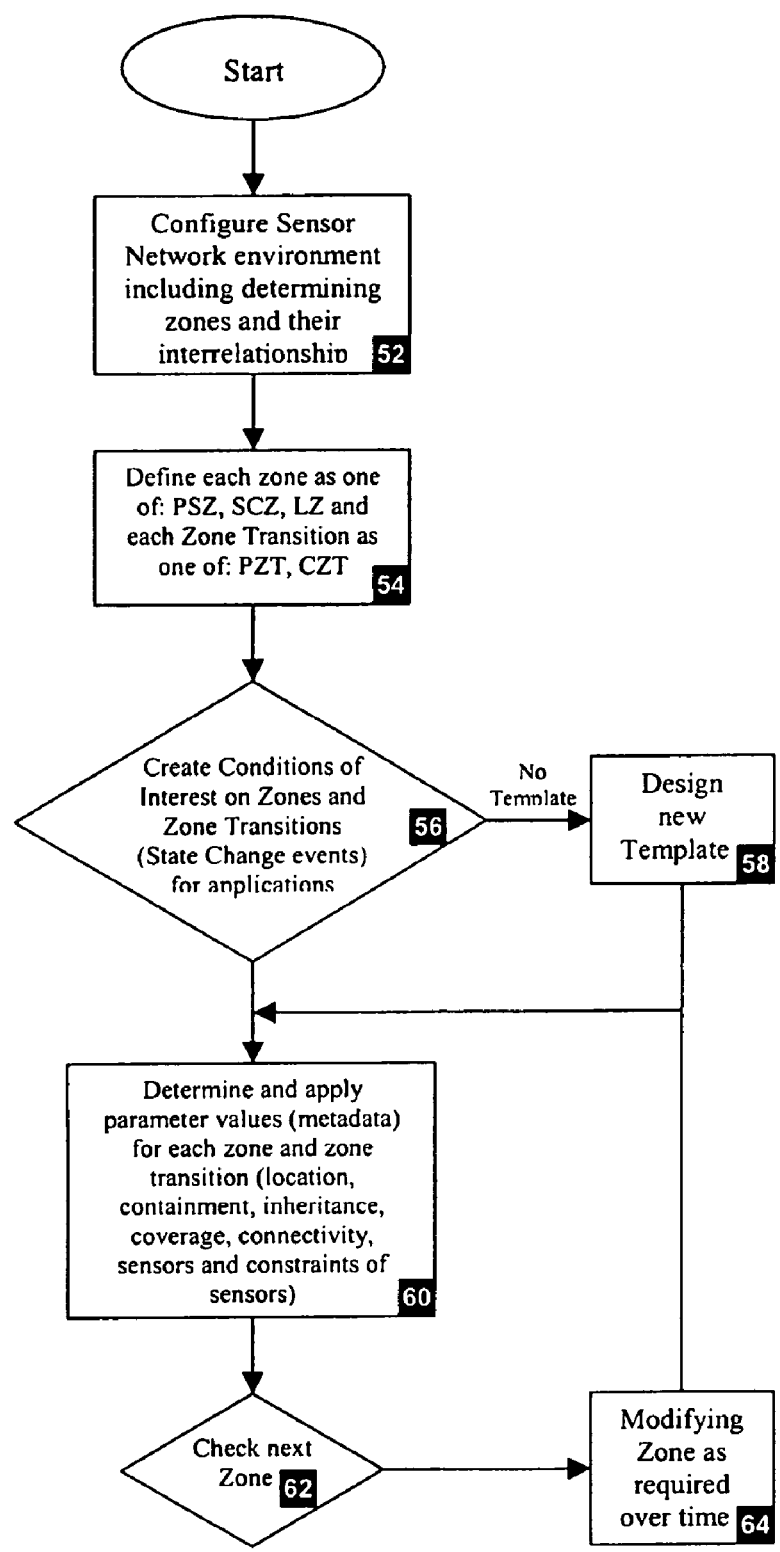
FIG. 4 presents a flow chart of a method of configuring a Sensor Network Environment in an embodiment of the invention.
Figure 5:
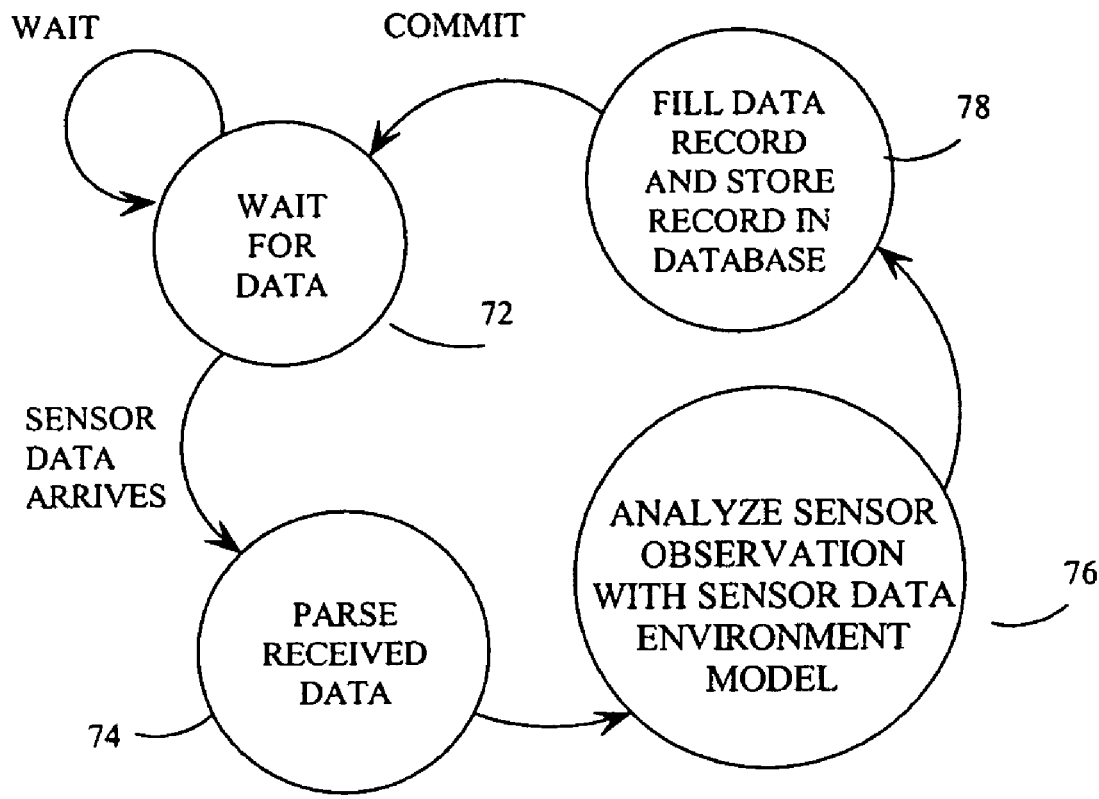
FIG. 5 presents a state diagram of a method of receiving sensor data in an embodiment of the invention.
Figure 6:
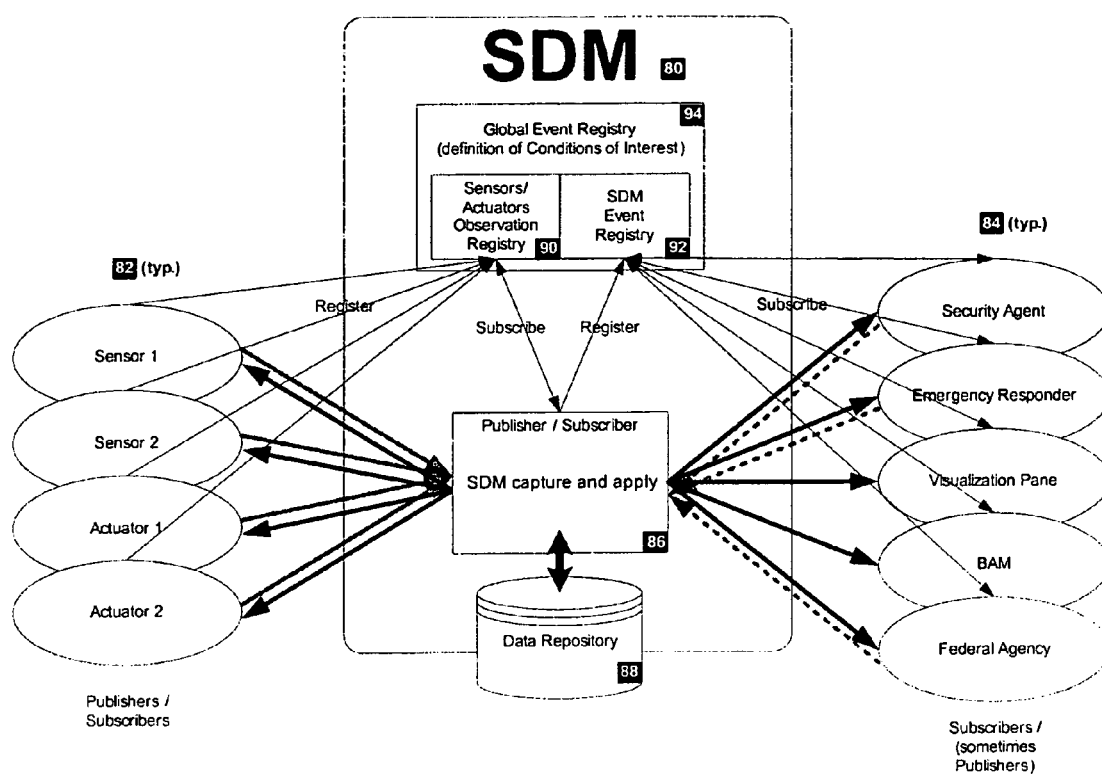
FIG. 6 presents a block diagram of Sensor Network Environment in an embodiment of the invention.

FIGS. 3-5 present simplified flow and state diagrams for the implementation of such a sensor system. Similarly, FIG. 6 presents a block diagram of such a sensor system. A detailed description of exemplary zones, zone transitions and templates follow.

FIG. 3 presents an exemplary flow chart of the overall method of generating and operating such a zone-enabled sensor system. At step 32, the Sensor Network Environment itself is defined. As shown in greater detail with respect to FIG. 4, this step consists of defining all of the zones in the system, and setting their parameters.

The "conditions of interest" for the applications 24 accessing the data, are then established at step 34. As noted above, part of the efficiency of the system comes from the fact that not every software application 24 receives all of the sensor data. The software applications 24 only receive the data that they identify to the system at step 34, as being of interest.

With the parameters of the system now established, the system may execute at step 36, collecting sensor data as it operates. These data, or sensor observations, are applied to the Sensor Data Model at step 38. Analysis is then performed at step 40, by the software applications 24, who apply the sensor data as required.

Process control generally loops through steps 36, 38 and 40 as the system operates, though changes can also be made to the parameters of the system by looping back through step 34.

This embodiment has been presented in terms of a simple flow chart in the interest of clarity. Actual implementations would clearly execute in a more sophisticated manner, for example, being implemented in a multi-tasking operating system where the steps would not be executed in such a successive way.

FIG. 4 presents a flow chart of an exemplary method of configuring the Sensor Network Environment, expanding on step 32 of FIG. 3. This includes but is not limited to defining the Location, Containment, Coverage, Connectedness and Constraints of each of the Sensors. This environment configuration will typically help define the business process rules that apply in the Sensor Network.

At step 52, all of the zones of the system and their interrelationships are identified. Each zone is then defined at step 54 as one of PSZ, SCZ and LZ, or as a zone transition PZT or CZT. Each of these is described in greater detail hereinafter.

Zones are database constructs which are implemented in the SDM. Through meta-data information, Zones are configured within the Sensor Network Topology. Zones could be configured directly through PL/SQL, via a Zone-Builder user-interface (UI) similar to the UI used in Oracle Warehouse Builder products, or in some other similar manner. A brief description of the Oracle Warehouse Builder is given in an article titled "An Introduction to Oracle Warehouse Builder", by Mark Rittman available online at http://www.d-bazine.com/datawarehouse/dw-articles/rittman3.

The conditions of interest with respect to each zone and/or zone transition are then established at step 56. If no template exists for the creation of the conditions of interest for a given zone, then one can be created at step 58. In either case, process control then passes to step 60, where a set of properties or metadata are established for each zone and zone transition.

Step 62 then serves to loop the method back to check and initialize other zones at step 60. As part of this loop, step 64 is included to allow zones to be modified over time.

FIG. 5 presents a state diagram of a process for receiving data as per step 36 of FIG. 3. Again, this diagram is intended as a simplification of the real process. For example, it is expected that most systems will use parallel-processing and that many data may arrive at almost the same time, resulting in the launch of many software threads. As well, sensor data will generally arrive on the system as interrupts, rather than having to wait for the system to poll for data. The details of implementing these steps would be clear to one skilled in the art.

The arrival of new data at step 72 initiates the process of FIG. 5; until new data arrives, there is no activity with regard to this process. New data is simply parsed at step 74 and processed at step 76, where the sensor data is analyzed with consideration for the Sensor Data Model. The new data is then stored on the system at step 78 where it can be pushed to applications that require it at step 40.

FIG. 6 presents a block diagram of an exemplary zone-enabled sensor system. Sensors and Actuators 82 are registered to the Global Event Registry 94, more specifically a subset of it, the Sensor and Actuators Observation Registry 90 within the SDM 80 as data publishers and subscribers. Sensors are not only data publishers, but most sensors can actually be controlled as well (configuration change, start-stop...). Respectively, Actuators can apart from receiving data also send out data such as control feedback or heartbeat information. Software applications 84 that are interested in Sensor Network events register through a subscription to the SDM event registry 92 which is also part of the Global Event Registry 94. The SDM 80 captures the incoming data and applies it to the environment and state model with respect to the conditions of interest formulated by the information consuming software applications. Once the SDM determines that an event satisfies a registered condition of interest, it pushes the event to the consumer in the way described by the subscription. This figure shows the fan-in fan-out principle of the SDM 80 as it virtualizes the Sensor Network Environment in such a way that it can actively serve all sensor network aware applications.

The SDM 80 consists of three major components. The Global Event Registry manages registrations through publishers and subscriptions. Every publisher registers itself herein describing which kind of data it can publish. A subscription can access this registry and define their conditions of interests. Both publishers and subscribers can define constraints on each other in order to control who receives the data or who produces the data. The Registry then matches publishers and subscribers through a mutual filtering. In FIG. 6, the global event registry contains two subsets which are marked as Sensors/Actuators Observation Registry 90 and the SDM Event Registry 92. This differentiation is only for illustration purpose and marks the difference between pure sensor and actuator observation and higher level SDM events. However, software applications can also directly register to receive sensor observations. This would be equal to the traditional model where the software application has to interpret the raw state-less observation data itself.

The Data Repository 88 is used to store past sensor data. This repository is very tightly integrated into the SDM Capture and Apply module 86 in order to allow for state-awareness. The data model must allow for a near real-time processing and should allow for an efficient operational sensor environment configuration as described above.

The SDM Capture and Apply module 86 is responsible for capturing the stream of observations coming from the sensors and to a lesser part from the actuators, and apply them to the state model using the operational environment description and conditions of interests in order to determine if an event has to be created. Note that events are only created if there is an active subscription registered in the global event registry. This allows for a significant reduction of computational processing power required to handle several tens of thousands of sensor observations per second. State-Awareness also allows for a powerful complex event processing which provides capabilities to define events that are based on a multitude of time and spatial disparate sensor observations. The Capture and Apply module is also responsible to capture non-events which are based on the configuration of the operational environment. By using the state-awareness described above it controls what events are expected to happen using complex event processing. If the time window for the expected event passes, the software application consumer needs to be informed.

Every situation that occurs that is not as specified in the current description can automatically be handled with a default exception handling system (for example, via email, voice alert or webpage display). Over time, the operational manager might want to design additionally specific exception handling mechanisms for individual exceptions and can do so by adding rules to the system. These rules, other than traditional exception handling applications do not have to manage the states of the object or the environment as that is done in a optimized form by the SBS itself therefore further reducing complexity and code base for the applications.

In the sections below, the various Zone Models will be presented following a description of the Zone Transition Model which can be utilized to define constraints on zones to describe or restrict movements of objects through zones.

Physical Sensor Zones

Physical Sensor Zones (PSZ) are the most direct form of mapping Zones to a Sensor Network.

A PSZ is defined through one or more Sensors. The Sensor meta-data defines whether the Sensor is a Gate Sensor (between two Zones) or a Zone Sensor (defining a Zone) and therefore the entrance and exit condition for the Zone. The Sensors associated with a PSZ define its boundaries. In order to determine the direction of an object moving through a Sensor, the Sensor can either report the direction directly or utilize a condition function. One predefined directional condition function is determined through the SDM itself: with the help of zone transition definitions, the SDM can determine the direction by itself taking the Sensor Type (Gate or Zone-Sensor) and the previous Zone state into consideration.

Additionally, a PSZ can describe its relationship to another PSZ, for example, using PARENT, CHILD and SIBLING relationships. Properties or Constraints can be inherited through this implementation. For example, one can define a zone STORAGE_AREA within zone WAREHOUSE where STORAGE_AREA inherits the temperature value that is defined with the WAREHOUSE zone.

Zones definitions can also change over time. The operational environment might evolve and require a redefinition of zones (additional gate readers in the receiving area, etc.). Therefore, all Zones and Zone transitions preferably have a start- and end-time for their definition. These start- and end-time can be endless, static or dynamic. Whenever a query is done against the repository of the Sensor Data Model (SDM), the time period of the examined data will take into consideration the valid zone definition at that time.

An example of how different Zones are typically used in a Warehouse environment is shown in FIG. 7. This Figure shows five PSZs (PSZ_1, PSZ_2, PSZ_3, PSZ_4 and PSZ_5) plus the universal or undefined Zone PSZ_Ø. As an example, PSZ_1 could be defined as shown in Table 1.

In FIG. 7, there are six "gate sensors" which define the perimeter of the PSZ_1 zone. That is, in order to enter or leave PSZ_1, one must pass through one of these six gate sensors (Receiving_1, Receiving_2, Picking_IN, Picking_OUT, Shipping_1 and Shipping_2). By considering the number of times an RFID tag has passed through one of these gates, the system will know whether the product associated with the RFID tag, is in or out of the zone.

There are also three internal zone sensors (Smartshelf_1, Smartshelf_2 and Smartshelf_3) which indicate whether a product is positioned on one of the three shelves in the storage area. Zones PSZ_2, PSZ_3, PSZ_4 and PSZ_5 are identified as "child" zones in Table 1, because they all sit within the physical bounds of the PSZ_1 zone.

Note that zone PSZ_5 could be defined either as a child of PSZ_1, or as a separate and physically adjacent zone.

PSZ_1 therefore represents the interior of the warehouse minus the Smartshelfs and the gate enclosed picking area. The picking area PSZ_5 is delimited by a wall where the only doors are protected by the two gate readers Picking_IN and Picking_OUT. Note that there is no sensor to control the door that encloses the storage area. PSZ_1 therefore extends until the Smartshelfs are reached.

It is also important to note that the staging area is not identified as a separate zone. Although the staging area might be physically different from the rest of the warehouse, it does not include a sensor that would identify products and control that area.

PSZs require the observation conditions of a sensor in order to be of any value. For example, there is no way to distinguish the zones to the left of the receiving area or the right of the shipping area in FIG. 7. This limitation makes the implementation of PSZ simple; however it puts the responsibility of determining the correct (business) state of the object through an application. This might be acceptable when the determination of the business state requires extensive computation and context. However, most operational states in a supply chain or material management are highly structured and enforced. It makes sense therefore to offer more sophisticated zone models to simplify the complexity, the customization effort and the amount of code that needs to be written for a specific implementation.

Coverage Zones

Certain Sensors have a spatial range in which their reading is valid, or their measurement value depends on the range value. For example, a temperature sensor can provide accurate information within a certain range, but the quality of the measurement might change with distance between the RFID tag and the sensor. If the temperature value of an object is required and that object is physically located in-between two temperature sensors reporting different values, the system can calculate an approximation of the temperature based on the relative distance and the quality of the sensors (or on the air exchange rate, if available). Another common example is a location observation derived through a GPS device: there might be a certain accuracy or tolerance zone that might be valid for the observation. Coverage might be spatial or temporal or both: a certain sensor observation might be interpreted differently depending on the distance to the sensor location/reading as well as the elapsed time since the observation event.

For such sensors, Sensor Coverage Zones (SCZ) may be used. Such Zones are spatial temporal zones which include the (temporal) location of the Sensor, its quality of measurement, the area in which its measurements are valid and the quality change coefficient which describes the change of quality with increasing distance away (or passing of time). Additionally, SCZs include all properties of PSZs.

Extending the Warehouse example used above, FIG. 8 depicts two temperature sensors that are mounted on the north and south interior walls of the warehouse, associated with coverage zones SCZ_1 and SCZ_2 respectively. Assuming that the exemplary warehouse is a climate controlled building, their coverage does not extend to the outside of the building. The temperature in the picking area is assumed to be the same as that of the warehouse because no doors physically separate the picking area from the rest of the warehouse. The temperature sensor in the storage area however has a limited visibility beyond the physical enclosure of the storage area as its door is closed most of the time. Therefore, objects that are in the intersection of the SCZ_1 and SCZ_2 will be heavier weighted in favor of the temperature reading received from SCZ_2.

SCZ_2 could be defined as shown in Table 2. The origin column specifies the location of the sensor in either relative or absolute coordinates, and the quality function is the formula that serves to compute the quality of the observation based on the distance of an object to the origin of the SCZ. The inheritance columns specify if and how the observation can be inherited to another zone. In the case of SCZ_2, the observation is inherited by the picking area PSZ_5 and the general area PSZ_1 fully, but not by the smartshelfs (PSZ_2, PSZ_3 and PSZ_4).

Logical Zones

Logical Zones (LZ) are the most complex zone constructs of those described herein.

The biggest difference between a LZ and a PSZ or SCZ, is that a Logical Zone does not need to be tied to a specific Sensor or Actuator, but it can represent a conglomerate of Sensors, PSZs and SCZs together with abstract constraints. For example, one can define a Distribution Center by the ensemble of several Warehouses or Storage Areas which themselves are defined by multiple PSZs.

An LZ can incorporate additional context to determine whether an object is inside or outside the LZ. Therefore, the enter- and exit-conditions of the LZ construct can be defined dynamically in conjunction with an abstract business process. This can also depend on the access-level: for a corporation or site, several LZs are defined to control business processes within the corporation. For a federal agency such as the Department of Homeland Security (DHS) or Department of Transport (DOT), a different LZ definition might make more sense according to different business process needs. This way, access restrictions to the information of the SDM repository can be implemented on a granular level.

FIG. 9 presents a schematic diagram of how LZs may be applied, again in the context of the Warehouse example. Table 3 presents an exemplary data structure for the corresponding LZs.

From a high point of view, the entire warehouse is considered one LZ (LZ_1), and the outside world is be defined as the universal PSZ_Ø. If a delivery truck arrives at the receiving door (the arrival being detected by a sensor or being identified by an abstract condition), is authorized to unload (an abstract condition) and the manifest is confirmed (a further abstract condition), then the truck can be identified as entering a 'receiving' LZ (LZ_2). Similarly, trucks arriving at the shipping door are represented as a 'shipping' LZ (LZ_4 and LZ_5). Additional abstract conditions may also be applied to trucks arriving at the shipping door, as required (i.e. proper authorization, security level, etc.)

LZ_3 is an example of a temporal and spatial zone in which objects (pallets) enter whenever a pallet exits from the storage are and does not go to the picking area (timeout) or when a pallet exits the Picking_OUT gate. The pallet exits LZ_3 when the pallet exits either shipping gate. Note that this way items cannot move from the receiving gate directly to the staging area. Also, note that LZ_3 is also a spatial child of LZ_1.

Table 3 presents exemplary definitions for LZ_1 and LZ_2.

As shown in this table, a number of conditions must be satisfied in order for an object, O, to be considered to have entered LZ_1, specifically the object O must:

enter via one of the receiving gates Receiving_1 and Receiving_2; AND the value of the local time clock $T_o$ must show that the truck is at the receiving gates during regular business hours; AND validation must be made against an existing shipping manifest M.

Similarly, an object O must satisfy the exit conditions in order to leave LZ_1:

the object O must have been in LZ-3; AND the exit time $T_o$ must be during regular business hours; AND the object O must be verified against a valid shipping manifest M.

Also, note that LZ_1 has a number of child zones, LZ_2, PSZ_1, PSZ_2, PSZ_3, PSZ_4, SCZ_1 and SCZ_2, all of which physically fall within the area of LZ_1, so properties and constraints can be passed between the children and the parent.

Table 3 also presents exemplary entry and exit conditions for LZ_2, and identifies it as having two parent zones: LZ_1 and PSZ_1. Thus, properties and constraints can be passed between LZ_2, and its parent zones LZ_1 and PSZ_1.

Zone Transitions

One of the most important implications of Zones is the ability to define the movement of objects through Zones. Most business processes employing RFID are closely tied to the movement of RFID Tags through different operational processes. As the objects identified by the RFID tags are physical entities, each operational process is usually identifiable temporally (for example, process step B must be performed after step A and can be followed by either step C or step D) as well as spatially (for example, process step B is performed at the receiving area whereas steps C and D are performed at the picking and shipping areas respectively).

With a temporal and spatial Zone model as described here, such constraints on the process flow are very easy to implement. Rather than defining the movement of the objects/RFID tags themselves while having to keep the state of the object in consideration, one can describe how any object can move through the different Zones.

Also, when using LZ with zone transitions where one can define a zone in combination with a business process (for example the accomplished operational process mandate), the object movement can be controlled through the assurance that the completion of the operational process is a defining constraint for the LZ. Therefore, defining a zone-transition involving such a LZ is guaranteed to succeed only if the operational process is completed successfully.

Two exemplary zone transitions described herein are "possible zone transitions" (PZTs) and "context based zone transitions" (CZTs).

Possible Zone Transitions

When defining Zones (such as PSZs, SCZs, and LZs), one can define all (physically) possible direct zone transitions that apply to a set of zones in a zone transition table. These transitions can be handled directly by the SDM (Sensor Data Model) through the Zone description and their entrance and exit conditions. These transitions serve as a basis to define how objects can possibly physically move through the environment. Any violation of these transitions can be interpreted as either a faulty or missing sensor read or as some other problem. Using the PZT (Possible Zone Transitions) definition and the enter or exit conditions of the zones, the SDM (Sensor Data Model) is able to update the zone information for an object upon encountering a valid zone enter or exit condition.

For example, considering a zone model as shown in FIG. 10, there are two gate sensors S1 and S3, and one zone sensor S2, which can be used to define three Physical Sensor Zones PSZ1, PSZ2 and PSZ3, and the universal (undefined) Zone PSZ_Ø. The three Physical Sensor Zones PSZ1, PSZ2 and PSZ3 can be defined with the metadata shown in Table 4, and accordingly, the possible zone transition table would be defined as shown in Table 5.

Table 4 would be read in the same manner as Table 1, described herein above. The first line of the Possible Zone Transition Table, Table 5, would be read as follows: that there is a direct zone transition from the universal zone PSZ_0 to PSZ_1. Similarly, second through fourth lines of Table 5 indicate that there are three possible direct zone transitions from the zone PSZ_1.

The zone transition table data can be used as follows for the SDM:

when an object is reported in a zone, but its previous zone has no direct transition to that zone, an inconsistent zone transition exception is raised. For the above example, if object O is located in PSZ3, and it is then detected in PSZ2, an exception is raised because there is no valid transition from PSZ3 to PSZ2 defined. However, if the object is reported in PSZ3 and then in PSZ1, it follows a possible transition;

Parent-Child relationships can also help in monitoring transitions: PSZ2 is defined through a Zone-Sensor and is the child zone of PSZ1. Let's assume that an object O is reported as being in PSZ2. Then S2 reports O as "not visible". If the zone transition is controlled by the SDM, it will automatically place the object into PSZ1 since it is the parent Zone. Since there is a valid transition defined from PSZ2 to PSZ1, no error will be reported. If for any reason a later observation proves otherwise, an exception will be raised. This way, there is no need to explicitly create a checkout procedure for objects leaving PSZ2;

the limitation of this simple, SDM controlled transition model is that if an object leaves a zone and there is more than one directly reachable zone, an inconsistent zone state exception is raised if none of those zones report the object directly. This exception could represent a theft or loss of the object.

When an exception is being raised by the SDM, a rule or simple call-back can handle the specific information or provide a higher level application with the necessary information. An example of such an application is the activation of actuators in exception cases, such as a red light, a voice warning or sending an email to inform the authorities. For material movement scenarios, most operational steps require the successful termination of the previous step. With the use of PZT, one can achieve a monitored sensor network operational succession model. This capability makes the traditionally passive data repository an Active Data Repository.

However, PZTs are not flexible in the way the exceptions are defined. Exceptions are raised when transitions that are defined solely through sensor readings are not valid as given in the zone transition table. If a sensor network environment has to take additional context into consideration in order to resolve an ambiguous situation or less than 100% read rates, PZTs will not be sufficient.

Context Based Zone Transitions

The PZT offers a great model to describe how objects can possibly move between zones. However, it becomes quickly clear that one will require additional complexity in order to define object movements based on the context they are in. These transitions are then defined on top of the PZT to refine the object movements further. There can be different levels of complexity to CZTs.

In most operational environments, objects should move on pre-defined paths which might change if a certain environmental change occurs. For example, objects of type A have to go through a zone transition path PA, whereas objects of type B have to follow PB. However, when the temperature reading on PA is above a certain threshold, type A objects should take the alternative path P2A.

The PZT should be a superset of any CZT.

An exemplary Context Based Zone Transition Table is shown in Table 6. Like Table 5, Table 6 presents all of the possible zone transitions for a given set of PZTs, but it also identifies the contextual conditions must be satisfied to effect the transition. For example, a transition from LZ_2 to LZ_1 requires that a certain abstract condition be satisfied in order to allow the transition.

CZTs can be defined such that the actual transition does not even have to be related to a direct observation (i.e. a sensor reading an object). A business process outcome, for example, could be the trigger for a zone transition of an object (typically through LZs). Having such functionality is a very strong advantage over existing process control systems.

With PZTs, transitions are based on sensor observations directly, whereas CZTs base their workings on the interpretations of sensor measurement. If at any given point due to additional information this interpretation changes, so do the effects of a CZT. For example, if an object attempts to enter a zone and is denied because there is no valid zone transition from the previous zone of the object to the current, it could be that the situation is due to a missing sensor reading (certain sensor network environments cannot guarantee 100% read-rates). In this case, an exception can be raised to a computer screen informing a human supervisor to address this issue. This supervisor could conclude that the exception is merely due to a missing sensor reading or that this particular situation is acceptable and could override the situation by changing the context (temporarily) of that object in order to let it pass through. Internally, this could be realized, for example, by adding a dummy process "i", which demarks that at this point, a special intervention or unknown process was taken to override specified constraints. In order to have full auditing and consistency capability the interpretation is kept strictly distinct from the actual sensor observation. This way, one can correct wrong interpretations more easily without breaking the sensor observation consistency.

On a larger scale, these dummy processes can also represent an abstraction of the operational- or business process flow based on authorization- or privacy-level. If an object's history over its entire lifespan needs to be traced as shown in the block diagram of FIG. 11, one could imagine that its transport history is the crucial information that is needed. It may be important to know from which manufacturer it went, to which distribution center and to which store. What exactly happened in the distribution center may not be important or may not even be accessible. The only data of interest to the user may be the fact that the object arrived at a specific time at the warehouse and left it again.

These dummy-processes can also represent a temporal placeholder for delayed observations or processes. When using offline mobile readers, for example, and a required synchronization does not occur in time before the next operational step, the system can nevertheless continue operating normally using a dummy-process as a placeholder. Once the synchronization occurs, the dummy-process can be replaced by the actual observation and any necessary action can be taken if inconsistencies arise.

Returning once again to the Warehouse example, there are several zone transitions that would typically be utilized.

While zone transitions involving the trucks are CZTs due to the dynamic context based definition of LZ_2, LZ_4 and LZ_5, transitions inside the Warehouse are typically PZTs. Additionally, one can express that when an object leaves one of the Smartshelfs (PSZ_2-PSZ_4) and does not appear at the Picking_IN gate within a specified time, the object will be assumed to be in the staging area (LZ_3).

Timeouts are extremely valuable constraints that can be expressed on transitions. That is, if hazardous or perishable materials arrive at receiving, they should be moved to the storage area within a certain time otherwise the operational manager should be informed. These non-events as described above are possible to be configured through the state-awareness of the system.

Even in retrospect, these transition times can shed valuable business intelligence as it could reveal certain delay patterns between operational steps (BI).

Sensor Topology Templates

One of the goals of the SBS architecture is to define horizontal or vertical templates that can be shared and customized through simple parameters. In a specific implementation, one would then identify the applicable templates and configure them to suit the individual operational environment. One would generally begin implementation by relying on simple templates, and build up a library based on customizations done at specific sites, which can be abstracted into templates.

As noted above, these templates can be regarded as 'wizards' similar to those used in a windows environment, guiding the operator through the parameterization of the 'workflow' of these processes. Often events cannot be defined solely on a single sensor observation (such as a RFID reading or a temperature reading). Application events are usually defined based on an operational state change, for example, answering the question "I have received goods through my receiving area which I had ordered previously". Such a state change is actually extremely complex to determine, and the use of templates greatly assists in the development of the system.

Templates can come in several shapes and forms. They can be defined on a business level (such as a terror attack warning), an operational level (such as verified pallet was received), but also on a very basic level such as individual sensor readings. For a simple example on a sensor measurement level, a closeness template would classify two or more sensor readings belonging together temporary or spatially (or both). The parameters to this template would be the location and the maximum read-time difference between the individual measurements.

The same closeness template could be used for very different problems. For example, it could be used to facilitate asset tracking or material management; the system could automatically determine which person (assuming people and asset movement are tracked by sensors) was last "seen" with a specific object. This could be determined because both objects have been sensed by sensors spatially and temporarily close to each other. Using this derived information, the asset management application could automatically initiate a handover of the asset to that person, if the object was associated with someone else before (automated check-out and check-in). This is especially useful in environments where the check-in/out counter for the material is located far away.

As another example, this closeness template could be used in the context of the Warehouse example. A common problem with sensors is that they sometime do not sense what they should, and sometimes they sense what they should not (referred to as a cross-read). Assuming there is a pallet destined for the Truck LZ_4, leaving at Shipping Gate 1 which is being pushed to Gate 1. As depicted in FIG. 12, the path for items coming from the picking area leads very closely by the Shipping Gate 2 which causes the sensor to often pick up several tags from the pallet. This would normally cause the Outgoing_Verification to create an alert since a pallet destined for Gate 1 is going through Gate 2. Configuring the template, one can specify to "ignore" such true-false reads by specifying that: if object O gets sensed by gate S1 and it is not supposed to be there, hold alert A for x seconds to verify if the O has been picked up by the correct reader S2 within x seconds that follow.

With the above example, one could also include a template like "Qualitative assessment of the number of tags that got read". Based on this template, rules can be configured such that they are only executed if the read-quality of a sensor observation is above a certain threshold.

A true-false read usually does not report the same quality as a true-true read: the Sensor from Shipping Gate 2 of FIG. 12 will most likely only pick up a few tags of the pallet because it is further away or did not have enough time to read all tags on the pallet whereas the Shipping Gate 1 will read the entire pallet. In this example, a quality assessment template would be configured to compute the quality of the observation based on the amount of tags picked up compared to the expected number of tags on the pallet.

More complex templates can now be defined on top of these lower-level sensor measurement centric templates.

Templates might also be defined on a higher level through business processes, such as Industry Mandates. These would then have to be implemented in the operational sensor network environment. For example, the Department of Transportation mandates that chemicals are handled in a specific way such as that certain operational processes which last longer than a specific time the temperature of the chemicals need to be captured and cannot exceed a specific temperature for a certain duration. Through the use of such templates, which can now be formulated independent of a specific installation or implementation, complicity of industry mandates can easily be achieved and verified by applying these templates.

User interfaces (UIs) can also be generated to organize and create templates which can be applied to a customized Sensor Topology. The operational manager would then only have to fill in the required parameters (such as timeout values and the form of the message to be sent out to an application handler). Under the covers, the template would be implemented through PL/SQL and applied on the Sensor Data Model (SDM).

Advantages

The embodiments of the system and method described herein provide many business and marketable advantages over the systems known in the art. For example, they reduce the complexity of process control solutions as well as the amount of code that is required for implementation, while maintaining the overall goal of total visibility throughout the operational process chain. They also enable software applications to share the state-aware virtualization to define their conditions of interest, such that only relevant state changes are propagated to them.

As noted above, existing process management systems that track objects through the operational environment generate an "avalanche of data" which takes a lot of resources to manage. Also, because they follow objects throughout the operational environment, they have to specify all of the unexpected situations the object can enter into. This requires the application to keep complete control and knowledge about the state of the object as well as its environment. This comes with a high price as it requires significant amount of computing resources.

Also, as noted above, software developers typically spend 90% of their time on the small number of exceptions that must be dealt with. In contrast, the zone-enabled sensor system specifies the operational environment (rather than the objects itself) and how objects can move within it. There are fewer exceptions because the software is designed to reflect the physical reality, rather than starting with a predetermined software structure and seeing how best you can use it to describe the physical reality. This is simpler and can be done in a very short time and by the person who is best suitable for it: the operational manager himself.

The use of zones and zone-transitions reduces the complexity of solutions and amount of code required by modeling the operational environment and defining the processes on the environment, rather than on the objects. Thus, the data observations are organized with respect to operational zones as they travel through them, rather than simply dumping all the data into the DB in an unorganized way. Storing by zone makes it much easier to analyze and manipulate the data.

It is difficult to analyze data in existing systems because there is no regard for the underlying processes and operational environment context—again, the data observations are sensor outputs which are simply stored as raw data. In contrast, the zones described herein are designed to reflect the physical operational environment, so that data is started in a logical way that relates to the queries that will be received. The data is stored in a standard DB using a standard model, which is application agnostic.

Application processes and events are usually defined at a high level in the art, and typical DB systems are intended to deliver pure observed data. In contrast, the zone-enabled sensor system easily supports and enables higher level queries.

The system allows quite extensive data compression to be done in a loss-less manner, by incorporating what is known about the data and its context.

For example, one may receive a temperature reading every second from a temperature sensor. Rather than storing that information in terms of "point readings", it is easy to record "period readings". That is, if the sensor reports arriving every second have the sequence 40, 40, 40, 40, 41, 41, 40, 40 and 40, then the system can store 40 for the first time and "maintain" that state until it is not valid anymore (i.e. when we get the reading 41 arrives). The Zone that receives and stores this data will not change until the readings that it receives change. Accordingly, it will not notify any applications of new data, until the change occurs. This is in contrast to systems known in the art, where the outside processes would still receive the data every second, even though it was unchanged.

As another example, one could decide that a tolerance of plus or minus 2 degrees is acceptable (the error margin of the temperature reader). If the same data sequence noted about is received, that is, 40, 40, 40, 40, 41, 41, 40, 40 and 40, then the value stored will be the first 40 together with the context of the error margin (±2). In such a case, the volume of data stored has been reduced by a ration of 9:1 without losing any data. Furthermore, no resources were consumed sending data to each process every second.

Options and Alternatives

The concepts described herein can be applied to various database products or environments with a minimum of integration. For example, any application can be "Sensor (Network) Enabled" through Oracle BPEL (Oracle BPEL is a programming abstraction that allows developers to compose multiple discrete Web Services into an end-to-end process flow; it has built-in support for asynchronous interactions, flow control and XML data manipulation). The application and its internal process flow do not have to be changed as the integration software would connect to the virtualized Sensor readings with the internal application event API.

Other possible options and alternatives include the following:

A. The concepts described could also be applied to a distributed sensor data model. Working across multiple departments, corporations, federal agencies, sensor data and the derived information can be shared. For example, a SDM system when discovering a terrorist attack, can cascade the information to other agencies which could change their operational processing by applying global templates (i.e. a DHS threat level change could trigger business and operational procedure changes at a connected federal agencies such that sensors and actuators have to be treated differently);

B. The sensor data model acts as a Data Hub for Sensor related information. In order to execute rules, meta-data is a crucial element. This meta data may be provided from other data sources such as a data warehouse or Oracle Product Data Hub or Oracle Customer Data Hub. At the same time, the SDM would provide meta-data information to those hubs to run their rules. This can happen on the same communication channel. This way, there is a much clearer distinction of what data is the object data and what data is the meta-data. For example, if there is a rule that needs to run on the RFID tags in order to trace their movement through the operational environment in order to determine if a shipment has arrived, it would run on the SDM. However, if a rule needs to be executed on the shipment, i.e. if it has been paid for, it would be executed in the warehouse management system. In both cases, the system not running the rule would provide the other system with the meta-data;

C. It is a common misperception that the EPC (RFID tag data as defined through EPC global) represents the actual product the tag encodes. Instead, the sensor observation only reads the encoded tag. A warehouse management system may interpret this reading as representing a product, but a clear distinction must be made between the two. Sensor data is inherently uncertain and incomplete and through operational errors, a tag might contain wrong data or the tag may have been attached on the wrong casing or product. It is much easier to handle errors on the correct level. The SDM has very advanced capabilities to handle errors, auto-correct and auto-complete erroneous sensor data;

D. Understanding the sensor network environment and providing the tools to manage the operational environment together with templates provides the system with very strong capabilities to handle uncertainty, incompleteness and erroneous data. A rich UI framework can provide the insights into the system in order to manually or automatically self-adjust;

E. Huge advances in machine-to-machine communication and the higher availability of data acquisition also mean that more and more data gets stored and has to be analyzed. However, more data does not necessarily mean more information and the avalanche of data or information often means an overload of information for humans. Data mining represents a powerful technology to extract patterns of interest out of large sets of (not human readable) data. However, in order to do effective data mining, the underlying data model has to be well understood in order to guide the data mining processes. The SDM offers a very detailed view into the model and represents therefore the ideal environment for automated data mining. In fact, it is so powerful that even unsupervised or descriptive data mining can easily be executed on the data (for a whitepaper on data mining techniques used in Oracle Data Mining, see "Oracle Data Mining 10 g Release 2—Know More, Do More, Spend Less—An Oracle White Paper—September 2005", by Charlie Berger, available online at http://www.oracle.com/technology/products/bi/odm/pdf/bwp_db_odm_10gr2_0905.pdf). With the help of BI, the discovered raw data pattern can then be translated and presented in a human readable form. For example, unsupervised data mining could extract a following raw data pattern:

Between UTC 11:00 and UTC 14:00 sensor objects with the bitmask XXXXX 1001001 XXXXX stay 35% longer in Zone 1 before transitioning into Zone 2 than other sensor objects.

Applying a BI model on top of the operational environment description extracted from the SDM would display the above pattern in the following human readable form:

Shipments coming from P&G arriving in the morning shift (6-9 am EST) by 3PL DHL stay 35% longer in the receiving area than other shipments before being processed into the storage area.

This represents valuable information that can be used to improve operations;

F. Advances in database technology such as Oracle's data change notification, persistent and transient continuous queries, flashback and expression filters (for a reference to expression filters, please see http://doi.ieeecomputersociety.org/10.1109/ICDE.2004.1320031) will allow for an increasingly rich interface framework of the SDM exposed to applications. With that, applications have increased flexibility to query and analyze sensor data. Exposing the state change model through these technologies will give the applications full capability to define their own events (state changes) there are interested in without having to manage the sensor network environment;

G. With the state awareness model and flexible event definition as described above, much more sophisticated information dissemination is possible. Rather than current art publish subscribe technology (Oracle AQ and IBM MQ series) one can use subscriber defined publications and information consumer aware publications. Systems such as the INFOD model by GGF (reference) would be able to leverage the rich event capability of the SDM;

H. This system shows that Sensor Data can be analyzed to represent different information depending on the applied application model. Machine-to-machine system and vast data acquisition exposes the difficulties and challenges of deriving information from data. This also exposes a new threat for security systems: while the raw (sensor) data might be unclassified and even publicly available, the information derived out of it by applying the SDM together with meta-data might now represent classified information. It is therefore important to extend classical security systems to not only protect the raw data but also the information analysis, i.e. the rules. Future work should extend the SDM to incorporate a Service Profile Model where the profile incorporates the identity and the rights of the information consumer and the service would execute the rules and the data analysis. This allows for a much improved and fine grained security model that extends beyond the data security to include the information protection as well as the protection of the rules which were used to derive the information;

I. The knowledge of the process transition and translation between the business process and their operational implementation leads to another advantage of the SDM. Today's operational environments are not necessarily equipped with a Sensor Network and for an operator it is not evident, where which kind of sensors would have to be placed in order to achieve maximum efficiency or compliancy. With templates readily available, the system could now be utilized to suggest sensor choke points, zones and transition rules. This could be achieved by the same workbench tool that may serve as a dashboard showing the sensor activity in the operational environment.

CONCLUSIONS

The present invention has been described with regard to one or more embodiments. However, it will be apparent to persons skilled in the art that a number of variations and modifications can be made without departing from the scope of the invention as defined in the claims.

The method steps of the invention may be embodiment in sets of executable machine code stored in a variety of formats such as Object code or source code. Such code is described generically herein as programming code, or a computer program for simplification. Clearly, the executable machine code may be integrated with the code of other programs, implemented as subroutines, by external program calls or by other similar techniques.

The embodiments of the invention may be executed by a computer processor or similar device programmed in the manner of method steps, or may be executed by an electronic system which is provided with means for executing these steps. Similarly, an electronic memory medium such as computer diskettes, CD-Roms, Random Access Memory (RAM), Read Only Memory (ROM) or similar computer software storage media, may be programmed to execute such method steps. As well, electronic signals representing these method steps may also be transmitted via a communication network.

The Zone concepts presented in this paper are not limited to RFID, but apply genuinely to all Sensor types and Actuators respectively. Specifically, pick-to-light, conveyors/diverters, carousels, and AGVs (automated guided vehicles) can also effect zone transitions. For instance, even in the absence of RFID, AGVs in a highly structured environment can provide all movement data.

All citations are hereby incorporated by reference.

What is claimed is:

1. A method of managing sensor data comprising the steps of:
defining a Sensor Network environment in terms of zones, each said zone being defined by its entrance or exit condition, and having a distinct and consistent property associated with it, wherein the defined Sensor network environment is based on operational and business process rules that apply to said Sensor Network environment;
collecting sensor data regarding the state of objects within said Sensor Network environment;
analyzing said collected sensor data in the context of said Sensor Network environment and said zones; and
storing said analyzed sensor data as records in a database, in an application agnostic form, and in terms of said zones.

2. The method of claim 1, wherein said step of defining a Sensor Network environment comprises the step of:
defining the state of an object in a given zone to be responsive to a sensor reading reaching a predetermined value.

3. The method of claim 1, wherein said step of defining a Sensor Network environment comprises the step of:
defining the state of an object in a given zone to be responsive to a logical process definition being satisfied.

4. The method of claim 1, wherein said step of defining a Sensor Network environment comprises the step of:
defining the state of an object in a given zone to be responsive to the requirements of a time-based restriction being satisfied.

5. The method of claim 1, wherein said step of collecting sensor data further comprises the step of:
collecting sensor data representing the state of environmental conditions within said Sensor Network environment.

6. The method of claim 1, wherein said step of defining a Sensor Network environment comprises the steps of:
identifying, defining and configuring said zones; and
setting values for parameters of each of said zones.

7. The method of claim 6, wherein said step of defining a Sensor Network environment comprises the steps of:
identifying, defining and configuring said sensors associated with said zones; and
setting values for parameters of each of said sensors.

8. The method of claim 7 wherein at least one of said zones is selected from the group consisting of:
Physical Sensor Zones (PSZs) defined by one or more physical sensors;
spatio-temporal Sensor Coverage Zones (SCZs); and
Logical Zones (LZs) defined at least in part by abstract constraints.

9. The method of claim 8 wherein at least one of said Physical Sensor Zones (PSZ) is defined by a Zone Sensor.

10. The method of claim 8 wherein at least one of said Physical Sensor Zones (PSZ) is defined as a Gate Sensor between two Zones.

11. The method of claim 8 wherein at least one of said Logical Zones (LZ) represents a conglomerate of Sensors and PSZ and SCZ together with abstract constraints.

12. The method of claim 8 wherein at least one of said Logical Zones (LZ) incorporates additional context to determine whether one of said objects is inside or outside said LZ.

13. The method of claim 8 wherein at least one of said Logical Zones (LZ) is defined through access privileges of a user or software application.

14. The method of claim 8, wherein at least one of said SCZs comprises one or more of: the temporal location of a sensor, its quality of measurement, the area in which its measurements are valid and the quality change coefficient which describes the change of quality with increasing distance or time.

15. The method of claim 7 wherein the step of defining said zone comprises the step of launching a software wizard.

16. The method of claim 7 wherein said step of analyzing said stored sensor data includes the step of determining zone transitions for objects.

17. The method of claim 16, wherein each said zone is defined in terms of a zone transition model defining constraints on said zones, defining allowable movements of objects through said zones.

18. The method of claim 16, wherein said zone transitions are context-based, defining object movements based on the context that they are in, changing path in response to a change in environmental conditions, or a business process outcome could be the trigger for a zone transition.

19. The method of claim 7, further comprising the step of notifying a software application of a state change for a zone.

20. The method of claim 19, wherein said step of notifying comprises the step of notifying a software application of a state change for a zone in response to said software application subscribing to notification of said state change for said zone.

21. The method of claim 7, wherein said zones may be defined under parent, child or sibling relationships, whereby properties and constraints may be held in common.

22. The method of claim 21, wherein each said zone is defined in terms of:
   location,
   containment,
   inheritance,
   coverage,
   connectivity and
   constraints of sensors.

23. The method of claim 1, wherein said step of defining includes the step of assigning properties and metadata for sensors within said Sensor Network environment.

24. The method of claim 1 wherein said step of analyzing comprises the step of determining the direction of motion for an object by considering relative times of sensor states, locations and whether sensors are gate or zone sensor types which have detected said object.

25. The method of claim 1 wherein said step of analyzing includes the step of responding to an exception by issuing an automatic email, voice alert or webpage display to an End User.

26. The method of claim 1, wherein said operational and business process rules are defined through layers, whereby said system can be easily customized for each operational environment.

27. The method of claim 1, wherein at least one of said zones has a temporal construct that varies over time.

28. The method of claim 27, wherein at least one of said zones is defined to have a validity time, defined through a start and end time of its construct.

29. The method of claim 1, further comprising the step of defining rules or actions based on zone events rather than on sensor observations.

30. A system for managing sensor data comprising:
   a plurality of sensors for detecting environment conditions including the presence of objects;
   a Sensor management engine; and
   a database;
   said Sensor management engine being operable to:
      define a Sensor Network environment in terms of zones, each said zone being defined by its entrance or exit condition, and having a distinct and consistent property associated with it, wherein the defined Sensor network is based on the operational and business process rules that apply to said Sensor Network environment;
      collect data from said sensors regarding the state of objects within said Sensor Network environment;
      analyze said collected sensor data in the context of said Sensor Network environment and said zones; and
      store said analyzed sensor data as records in a database, in an application agnostic form, and in terms of said zones.

* * * * *

UNITED STATES PATENT AND TRADEMARK OFFICE
CERTIFICATE OF CORRECTION

PATENT NO. : 7,479,875 B2 Page 1 of 1
APPLICATION NO. : 11/433379
DATED : January 20, 2009
INVENTOR(S) : Fehling et al.

It is certified that error appears in the above-identified patent and that said Letters Patent is hereby corrected as shown below:

On the Title Page Item (75), in "Inventors", line 2, delete "Nashua, NH" and insert -- Seattle, WA --, therefor.

On the Title Page Item (56), "Other Pubs", line 7, Delete "$print_{13}$ friendly" and insert -- print_friendly --, therefor.

In column 3, line 51, after "as a" delete "A".

Signed and Sealed this

Fourth Day of May, 2010

David J. Kappos
*Director of the United States Patent and Trademark Office*